Figure 1:
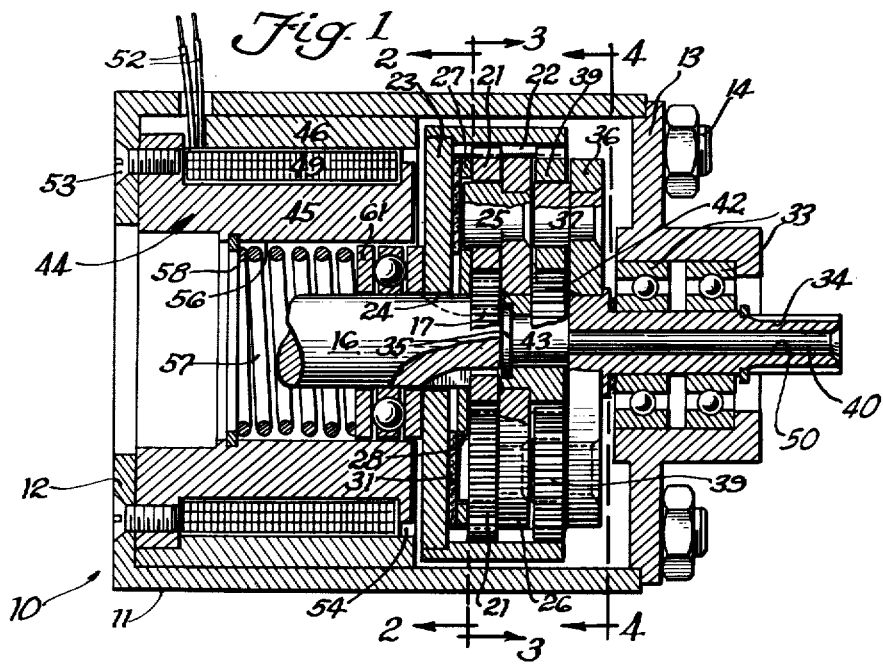

Nov. 17, 1953 W. F. CARR 2,659,249
TWO-SPEED PLANETARY TRANSMISSION
Filed April 6, 1950

INVENTOR.
William F. Carr
BY
Atty

Patented Nov. 17, 1953

2,659,249

UNITED STATES PATENT OFFICE 2,659,249

TWO-SPEED PLANETARY TRANSMISSION

William F. Carr, Grand Rapids, Mich., assignor to Lear, Incorporated, Grand Rapids, Mich., a corporation of Illinois Application April 6, 1950, Serial No. 154,325

6 Claims. (Cl. 74—785)

This invention relates to a power transmission. In particular it has reference to a two speed transmission of the planetary gear type.

Certain objects of the invention reside in the provision of a power transmission device, adapted to be positioned intermediate the power source and driven element, which shall be simple, positive in operation, compact, and long lived.

Another object is to provide a transmission device as aforesaid which is adapted for actuation by electromagnetic means.

Generally regarded, the invention comprehends the provision of a planetary gear train of one or more stages intermediate the power source and the driven element, the ring gear whereof is rotatable with respect to the input shaft during one phase of operation, and the last spider whereof is secured to the output shaft. The ring gear includes a disc-like ferromagnetic support, which latter, together with the ring gear, is arranged for axial movement against spring bias when a solenoid is energized. A friction member is interposed between the support and first planet gear array. Thus during deenergization of the solenoid the ring gear and the planetary arrays revolve as a unit to drive the output shaft at the same speed as the input shaft. However upon energization of the solenoid the ring gear and the associated friction member are moved away from the planetary arrays whereby to lock the ring gear to the solenoid. Thus the ratio of speeds between the input and output shafts is then governed by the speed reduction of the several planetary stages operating in their conventional manner.

In the drawing which shows one form in which the invention may be embodied in practice:

Fig. 1 shows a medial longitudinal cross section of a transmssion embodying the invention.

Figure 2:
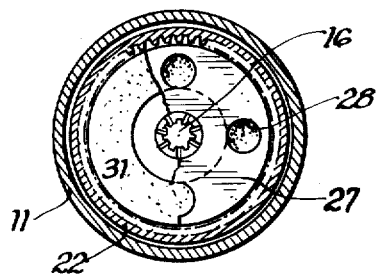
Figure 3:
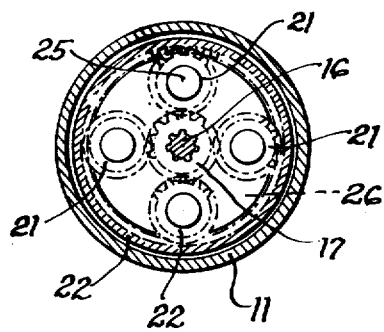
Figure 4:
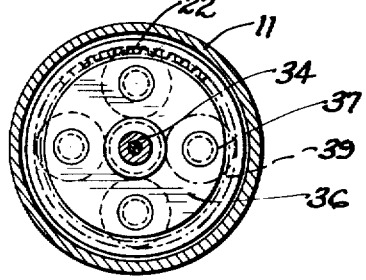

Figs. 2, 3 and 4 show cross sections taken on the lines 2—2, 3—3 and 4—4 respectively of Fig. 1.

Turning to the several figures the transmission comprises a housing 10 which includes a cylindrical side wall 11, an integral left hand annular end wall 12, and a right hand removable end wall 13 secured to the wall 11 by bolts 14, there being suitable lugs (not shown) protruding from the wall 11 to receive such bolts.

Input power from an electric motor or other source is provided through a shaft 16, such prime mover not having been illustrated per se. Shaft 16 is splined at one end for securement to a correspondingly splined sun gear 17 of a first planetary array. Gear 17 is in mesh with a plurality of planet gears 21 (in this example, four) in turn in mesh with the internal ring gear 22. Gear 22 comprises a shell secured to the periphery of a ferromagnetic disc 23 having an opening 24 for passage of the shaft 16, and upon which the disc 23 is free to rotate. Disc 23 constitutes an armature for the electromagnet to be described. Inasmuch as ring gear 22 must be heat treated and hardened, while the ferromagnetic disc 23 is of relatively soft iron, these two parts are manufactured separately and then united by pressing them together, brazing or otherwise, and as shown in Fig. 1. If desired disc 23 may include an extended bearing rotatable with respect to the shaft 16.

Planet gears 21 are revolubly carried on stub shafts 25 outstanding from the left face of a first spider 26, which in this case is shown as a disc. Overlying the left hand face of the group of planet gears 21 is a plate 27 (shown partly broken away in Fig. 2), such latter having apertures 28 for clearance of that portion of the shafts 25 protruding through the bore of their respective gears 21.

To the left hand face of the plate 27 is cemented a ring 31 of cork or other material adapted to coact frictionally with the ring gear support 23 in a manner to be described.

Housing end plate 13 is equipped with bearings 33—33 for supporting the output shaft 34 to which is keyed a second spider 36 carrying a plurality, e. g. four outstanding stub shafts 37 upon each of which is revolubly supported a planet pinion 39 in mesh with the ring gear 22.

Gears 39 are in mesh with a second sun gear 42 keyed to the spider 26, this latter gear finding revolving support on a shaft 43 having a reduced portion 40 in turn revoluble in a bore 50 within the output shaft 34, the shaft 43 being retained axially by abutment of a shoulder thereof against the shaft 34, there being a flange 35 for retention of the spider 26. At its extreme right end the reduced shaft portion 40 is retained by being upset into a countersink in the end of shaft 34. It will be understood that such upsetting is merely for endwise retention, and that shafts 34 and 43 are relatively free for rotation.

The gearing arrangement as just described constitutes a two stage planetary reduction, although it is within the contemplation of the invention to provide only one such stage or more than two.

At this juncture it will be noted that the construction of the parts is such that the gears 21 are capable of being sandwiched between the disc 27 and spider 26, and for a purpose to appear.

Fixedly retained in the housing 10 is the ferromagnetic core 44 comprising inner and outer cylindrical shells 45 and 46 defining between them an annular space for the reception of the solenoid or energizing winding 49, the conductors 52 of which are carried exteriorly of the housing 10 through a suitable aperture, as shown. Core 44 and the associated winding 49 are secured by screws 53 to the wall 12. It will be observed that shells 45 and 46 are so constructed as to define at the right end thereof an annular magnetic gap 54.

Within the bore 56 of the shell 45 is disposed a compression spring 57, one end of which is retained by a snap ring 58, and the opposite end of which bears against one face of the ball type thrust bearing 61, the other face of the bearing abutting the ring gear support 23.

Operation of the invention transmission is as follows: Assuming that the winding 49 is de-energized, as by being under the control of any suitable switching means, the parts will be in the position shown. That is to say, the support 23 including the ring gear 22 are in the right hand position by virtue of the bias of spring 57. Thus such bias is transmitted through the support 23, friction surface 31 and its supporting plate 27 to the left hand sun and planet gear array. Such latter is restrained axially by the shafts 43 and 34 acting against the bearings 33—33. Accordingly the gears 21 and the carrier 26 are firmly sandwiched between the support 23 and sun gear 42. If shaft 16 is in rotation the motion thereof will be transmitted via the sun gear 17 to the gears 21. However such latter are locked against rotation by the sandwiching action described, so that the entire panetary assembly is obliged to rotate as a unit, the gears 21, in effect, being fixed to gear 17 and the support 23 and its thereto-affixed ring gear 22 being obliged to rotate therewith about the axis of the shaft 16. Such rotation of ring gear 22 together with rotation of the carrier 26, to which the sun gear 42 is secured, will result in rotation of carrier 36 and shaft 34, the planet gears 39 acting simply as rigid links between the sun gear 42 and ring gear 22. Briefly considered, the entire gear reduction assembly rotates as a unit with the shaft 16 and will, consequently, drive output shaft 34 at the same speed. The foregoing could be termed the "high speed" or one-to-one phase of transmission.

For the "low speed" phase the winding 49 is energized to cause movement of support 23 and ring gear 22 to the left against urging of the spring 57, thereby to terminate the frictional coupling function of the disc 31 and the sandwiching pressure heretofore detailed. Accordingly the sun gear 17 is enabled to rotate the planet gears 21, and the ring gear 22, now being fixed by virtue of the magnetic flux of the winding 49 bridging the gap 54 and traversing the ring gear support 23, constitutes one element of the normally operating planetary gearing, output at the carrier 36 being effective to rotate the shaft 34 at low speed.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A two-speed power transmission comprising in combination a housing; a planetary gear train carried therein; a power input shaft secured to an input sun gear of the train; said train including a ring gear carried by and rotatable with a disc-like support; planetary gears and carriers therefor; a power output shaft secured to the final one of said carriers; a friction member interposed between said ring gear support and one set of planetary gears; means for biasing said support including its ring gear, said member and said planetary gears into frictional contact for joint rotation for one-to-one normal transmission of power; and means including a solenoid effective jointly with said ferromagnetic portion which, upon energization, will attract said portion to override said biasing means and to fix said support and ring gear for normal operation of the planetary gearing for low speed transmission of power.

2. A two-speed transmission comprising in combination a housing; a panetary gear train carried therein and including a ring gear, a sun gear, a plurality of planet gears and a carrier for said planet gears; said ring gear having a thereto-affixed disc-like support for joint rotation therewith; a power input shaft secured to said sun gear; a power output shaft secured to said carrier; friction means intermediate said support and planetary gears; means for biasing said ring gear, its support, friction means, planetary gears and carrier into abutting relation for joint rotation thereof for one-to-one normal transmission of power from said input shaft to said output shaft; and means for overriding said bias to fix said support and ring gear for low speed transmission of power.

3. A transmission as recited in claim 2 in which said overriding means comprises an electromagnet and said support comprises an armature therefor.

4. A two-speed power transmission comprising in combination a housing; an output shaft journalled for rotation in said housing; a sun gear mounted for rotation relative to said shaft; a plurality of planet gears in mesh with said sun gear; a carrier for revolubly supporting said planet gears and secured to said output shaft; a second carrier mounted for rotation relative to said shaft, said sun gear being secured to said second carrier; a second plurality of planet gears supported for rotational and axial movement on said second carrier; a second sun gear in mesh with said second plurality of planet gears; an input shaft secured to said second sun gear; an internal ring gear in mesh with all of said planet gears; a disc-like support secured to said ring gear for rotation therewith; a friction member intermediate said second plurality of planet gears and said support; said second plurality of planet gears and said second carrier being constructed and arranged for abutting frictional relationship; biasing means for urging said support, member, second plurality of planet gears and said second carrier into mutually driving frictional relation whereby said input shaft may rotate the planetary gearing as a unit to transmit power from said input shaft to said output shaft in a one-to-one ratio; and means for overriding said biasing means to release said frictional driving relation and to lock said support and its ring gear whereby said shafts are coupled in a reduced speed relation.

5. A transmission as recited in claim 4 in which said overriding means comprises an electromagnet and said support comprises an armature therefor.

6. A transmission in accordance with claim 1 further characterized in that said friction member includes a rigid disk having a facing of frictional material and said disk having an aperture, and the pivot for at least one of said planetary gears extends into said aperture for mutual rotation of said disk and the carrier of said one set of planetary gears.

WILLIAM F. CARR.

References Cited in the file of this patent

UNITED STATES PATENTS

| Number | Name | Date |
| --- | --- | --- |
| 1,157,001 | Howard | Oct. 19, 1915 |
| 1,410,384 | De Martino | Mar. 21, 1922 |
| 2,267,114 | Lear et al. | Dec. 23, 1941 |
| 2,391,333 | Nardone | Dec. 18, 1945 |
| 2,403,102 | Plotkin | July 2, 1946 |
| 2,464,129 | Goettisheim | Mar. 8, 1949 |
| 2,558,840 | Gordon | July 3, 1951 |

FOREIGN PATENTS

| Number | Country | Date |
| --- | --- | --- |
| 288,243 | Italy | Sept. 1, 1931 |

Certificate of Correction

Patented November 17, 1953 — Patent No. 2,659,249

William F. Carr

It is hereby certified that it appears that a mistake has been made in the above numbered patent and a showing has been made that such mistake occurred in good faith and was not the fault of the Patent Office, said mistake requiring correction as follows:

Column 4, line 5, after "support" insert *having a ferromagnetic portion*;

and that the said patent should be read as though corrected as specified.

Signed and sealed this 5th day of January, A. D. 1954.

[SEAL]

ARTHUR W. CROCKER,
*Assistant Commissioner of Patents.*